Jan. 27, 1970 W. WOLFING 3,491,751
MECHANICAL CHEST COMPRESSOR
Filed Oct. 24, 1965

INVENTOR.
Walter Wolfing

United States Patent Office 3,491,751
Patented Jan. 27, 1970

3,491,751
MECHANICAL CHEST COMPRESSOR
Walter Wolfing, 68 Hook Road,
Westminster, Md. 21157
Filed Oct. 24, 1965, Ser. No. 504,360
Int. Cl. A61h *31/00;* A63b *23/00*
U.S. Cl. 128—28                           3 Claims

ABSTRACT OF THE DISCLOSURE

This invention pertains to the art of mechanical aids to bodily functions and more particularly to the mechanical additions that are helpful in allowing the human body to breathe more efficiently. In the prior art there is shown in Patent 2,100,730, by F. Black, an animal clamp that is similar in physical appearance to the subject invention but lacks the crossed arms for actuation and has an off-set hinge that would cause pinching. Other devices for deep breathing are shown in Patent Nos. 1,074,846; 1,647,299; 1,134,320; and 2,220,593, all of which appear to lack the simplicity, ruggedness and kinesthetic efficiency of the subject invention.

---

The present invention relates to a mechanical human body compressor, more particularly a compressor for the chest or thoracic, upper abdominal, area of the human body. Also this invention relates to taking care of the condition in the human body known medically as "emphysema." The apparatus may likewise be used for respiratory diseases and conditions of the human body and for inducing artificial respiration.

During an ordinary human life, it is found that inspiration or taking air into the lungs tends to be a positive active muscular effort while expiration is a passive, almost non-muscular effort. Expiration usually is a relaxation of the muscles. This tends to let the atmospheric pressure do the work of producing an expiratory pulse. As the human body gets older (from approximately 30 years of age to 60 years and older) the positive inspiratory effort overshadows the negative or passive relaxing expiratory effort, so that the ribs tend to move upward and lose some of their downward sweep, or angular relation to a normal horizontal. This increases the anterior-posterior diameter of the chest as the ribs become almost parallel to the ground (or vertical to the plane of the spinal cord), that is, for a man standing approximately vertically. Thus, the volume of the chest cavity increases while the ability to move air in and out of the chest decreases. There is then more air space or unused lung present. Up to a point this is a normal aging process but the increase of dead air or unused air space and the relative and absolute decreased volume of movable air can reach a quantity or a ratio wherein the body receives insufficient oxygen in the "active air" or moved air portion to carry on simple physical movements that are required to function efficiently as a normally productive human being. This situation is called medically "mechanical emphysema" which contrasts to "chiectasis" (actual rupture of the small terminal air sacks known as the alveoli). Another lung destroyer, chronic asthma, is a condition that through spasms of the bronchioles traps air in the alveoli. All of the above cited conditions produce primarily marked reduction in the gaseous exchange ability of the lung and its membranes with respect to oxygen-carbon dioxide exchange and thus can lead to a serious pulmonary insufficiency and subsequent failure.

An object of the present invention is to provide a simple portable low cost rugged, tough, tear and scrape resistent respirator casing which comprises a single integral unit of two halves which is so easily applied to and removed from the patient that the patient himself can apply and remove the same.

This device is capable of several uses, but mainly, those due to compression of the chest cavity. One of such numerous uses would be in artificial respiration. Another and more important one would be that in breaking down the rigidity of the chest cage in order to reduce emphysema or lack of breathing capacity by loosening the individual members (ribs) of the chest cavity from their sockets and again making them more flexible. While not specifically designed for those types of diseases that are evidenced by the breakdown of the various tissues within the lung proper, it might be helpful in some cases; but it should be specifically useful in those diseases or deficiencies which are characterized by the breakdown of the flexibility of the lung cage and breakdown or atrophy of the muscles operating the cage.

Other and further objects and advantages of the present invention may be apparent from the following description and by reference to the accompanying drawings wherein.

Figure 1:
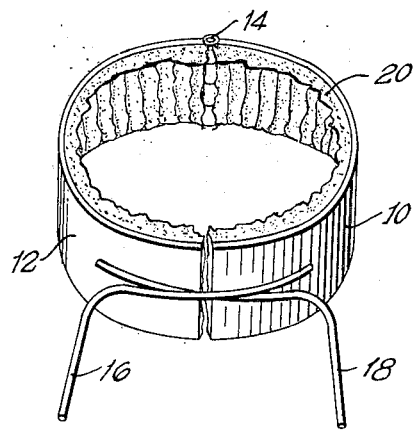
FIGURE 1 is a perspective view of a chest compressor embodying the present invention.
Figure 2:
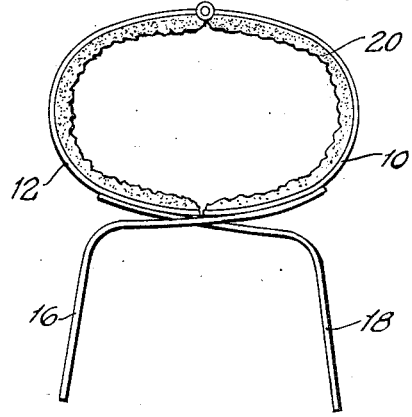
FIGURE 2 is a plan view of the same item shown in FIGURE 1.
Figure 3:
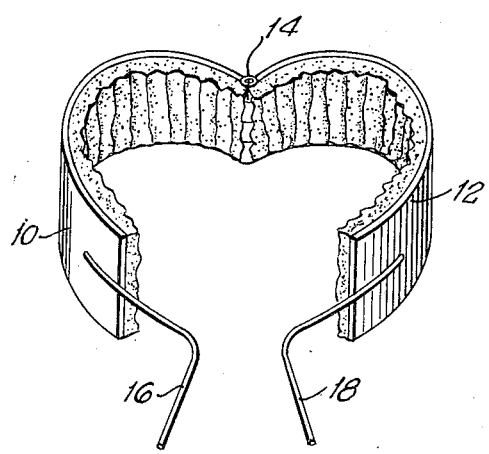
FIGURE 3 is a picture of the same device in perspective with the two halves in the open position.
Figure 4:
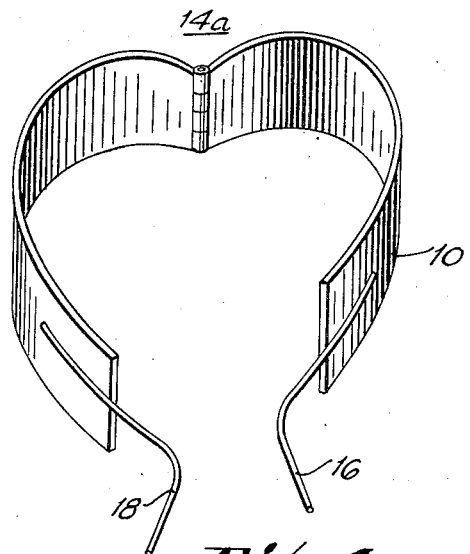

While FIGURE 4 is another perspective view of the device in a semi-open position with a modification of the hinge joint.

Referring now to FIGURES 1 to 4, a chest compressor can be simply described as a pair of semi-circular metal or aluminum cylindrical arms 10 and 12 connected by a flexible joint hinge 14 at a place that would be adjacent to the back of the body and having crossed handles 16 and 18 in front so that by pulling the handles laterally the effective diameter of the cylinder can be varied by decreasing, thereby compressing the lower chest and upper abdomen. In a procedure such as this, the ribs are forced downwards into their more useful position. At the same time the positive expiratory effort on the part of the patient in addition to the mechanical pressure in addition to external air pressure forces the diaphram upward, which squeezes more air out of the chest than the patient can without the aid of such a mechanical compressor.

This simple exercise then increases the air flow through the chest, and also tends to loosen and flex the cage members of the chest.

In the preferred form the two handles 16 and 18 are made out of ¼" to ½" diameter, but preferably ⁵⁄₁₆", stainless steel or other stiff metal rods and welded or otherwise rigidly fixed to the two compressing half arcs 10 and 12 which have a lining 20 of approximately ¾ inch foam rubber 20 on the inner faces. This foam rubber would be adhesively adhered in a manner known in the art. The back having a riveted or welded piano hinge 14 or a hinge 14 formed as a part of the semicircular frames 10 and 12.

The dimensions while not specifically critical are the preferred ones and have a normal variation of plus or minus 25% and wherein the semicircular arcs form an annual ring that is 2 to 5 inches, preferably 4 inches high in the front and 3 to 7½ inches, preferably 6 inches high in the back and in uniformly tapered from back to front and the arms are tapered off the end of the arc for some approximately 10 inches and then bent at approximately 100 to 175, preferably 135 degrees to have a 5½ inch handle. Now, as can be seen these dimensions could be varied somewhat without seriously affecting the item's ability to function. However, a maximum of 9 inches in the back and a maximum of 7 inches in the front would be the greatest that could be conveniently used for the average patient, while a minimum of 3 inches in the back and 2 inches in the front would also be a minimum for an average patient and the handles 16 and 18 could easily be made of wood or plastic or other semirigid material and could be such that they were screwed on or frictionally attached to the stainless steel rods or directly attached to the arcs. The choice of stainless steel in this case for the handles gives a certain desirable springiness that allows a resiliency to the pressure applied in trying to reduce the chest cavity size. The presence of the foam is such as to aid in producing the greatest comfort for the person who is undergoing the mechanical treatment. The particular manner in which the two C-shaped compressing arcs 10 and 12 are formed may be varied in almost any manner desired so long as it substantially achieves the general idea of compressing or wrapping the chest wall. While there is shown and described one embodiment of my invention, it is to be understood that this disclosure is for the purpose of illustration only and various changes and substitutions of equivalent elements may be made without departing from the spirit of the invention as set forth in the appended claims. For example, the stainless steel rods could be chrome plated spring steel rods or for that matter could even be fiber glass reinforced plastic rods, while the aluminum "C" shaped halves could just as easily be either stainless steel or laminated canvas phenolic molded to the general shape of the body and the hinge instead of being a pin type could easily be one of the flexible leather, plastic or cloth materials providing a hinged effect. Of course, the handles instead of being operated for pulling could also be arranged so that they do not cross when operating for pushing although this is considered less desirable due to the fact that the operator's muscles would then be at greater disadvantage. A mechanical electrical hydraulic or pneumatic power actuator could be suitably attached in place of the handles.

I claim:
1. A mechanical chest compressor comprising two substantially rigid C-shaped arms, hingedly fixed at their common ends, two handles which are attached to the other (noncommon) end of said C-shaped arms, said handles adapted to provide a decreasing area enclosed by said C-shaped parts when said handles are pulled in opposing directions, said C-shaped or semicylindrical arms being of such a size and shape as to be slightly smaller than a substantial cross section of the average human's chest, said arms being attached to each other at one common end thereof; said handles operating to force selective compression so that the chest capacity can be increased and decreased.
2. A mechanical chest compressor as in claim 1 herein, said C-shaped arms are formed of resilient material adaptable to be formed by hand to fit snugly against the selected contours of a patients body in a substantially compressive manner.
3. A device as in claim 1 herein, said handles are substantially parallel to each other in the position of noncompression when applied to a human chest.

References Cited
UNITED STATES PATENTS

| 497,774 | 5/1893 | Denison | 128—25 |
| 620,346 | 2/1899 | Mueller | 272—57 |
| 651,962 | 6/1900 | Boghean | 128—28 |
| 1,721,709 | 7/1929 | Odell | 272—57 |
| 1,883,041 | 10/1932 | Somers | 24—285 |
| 2,069,552 | 2/1937 | Mikulasek | 24—285 |
| 2,486,667 | 11/1949 | Meister | 128—28 |

CHARLES F. ROSENBAUM, Primary Examiner

U.S. Cl. X.R.
24—285; 272—57